United States Patent [19]

Gruffaz et al.

[11] 4,111,919
[45] Sep. 5, 1978

[54] THERMOSETTING COMPOSITION FROM A BIS-MALEIMIDE AND N-VINYL PYRROLIDONE

[75] Inventors: Max Gruffaz, La Mulatiere; Jean-Louis Locatelli, Vienne, both of France

[73] Assignee: Rhone-Poulenc Industries, Paris, France

[21] Appl. No.: 719,282

[22] Filed: Aug. 31, 1976

[30] Foreign Application Priority Data

Sep. 19, 1975 [FR] France .............................. 7529460

[51] Int. Cl.$^2$ ............................................ C08G 69/26
[52] U.S. Cl. ................................... 526/264; 521/147; 260/857
[58] Field of Search ....... 260/78 UA, 47 CZ, 47 UA; 526/264

[56] References Cited

U.S. PATENT DOCUMENTS

| 3,712,933 | 1/1973 | Ducloux et al. ................ 260/857 PI |
|---|---|---|
| 3,761,430 | 9/1973 | Witzel ............................... 260/2.5 B |
| 4,035,345 | 7/1977 | Ducloux et al. ................. 260/78 UA |

*Primary Examiner*—Harold D. Anderson
*Attorney, Agent, or Firm*—Stevens, Davis, Miller & Mosher

[57] ABSTRACT

A thermosetting composition is disclosed characterized in that it comprises (by weight) from 60 to 90% of a bis-maleimide of the formula:

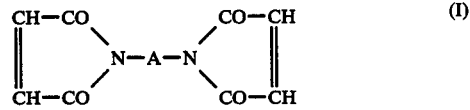

(I)

in which A represents a divalent radical chosen from the group consisting of phenylene radicals and radicals of the formula:

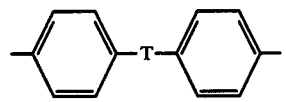

where T represents —CH$_2$—, —C(CH$_3$)$_2$—, —O— or —SO$_2$—; and from 10 to 40% of N-vinylpyrrolid-2-one. The preferred bis-maleimide is N,N'-(4,4'-diphenylmethane)-bis-maleimide. The composition may be modified by the addition of an unsaturated polyester. The composition is useful for the manufacture of molded articles or of articles having a cellular structure, or for the impregnation of electrical coils.

2 Claims, No Drawings

THERMOSETTING COMPOSITION FROM A BIS-MALEIMIDE AND N-VINYL PYRROLIDONE

The present invention relates to new thermosetting compositions based on bis-maleimides.

It is known (French Pat. No. 1,455,514) that insoluble and infusible polyimide resins, which only decompose at a high temperature, can be obtained by heating bis-imides of unsaturated carboxylic acids. It is also known (U.S. Pat. Nos. 3,562,223 and 3,658,764) that shaped articles molded from such resins are fragile and that in particular these articles craze after heat exposure tests of relatively short duration.

It has now been found that compositions which give coatings or molded articles possessing particularly valuable properties—which will be discussed in greater detail below—can be prepared by combining a bis-maleimide with N-vinylpyrrolidone. With a view to certain applications, for example molding by casting or impregnation of fibrous substrates, these compositions can also be modified by incorporating an unsaturated polyester before curing.

Accordingly, the present invention relates more particularly to new thermosetting compositions characterized in that they comprise (by weight) from 60 to 90% of a bis-maleimide of the formula:

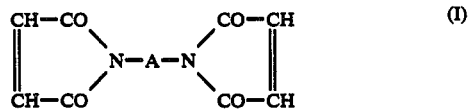

in which A represents a divalent radical chosen from the group consisting of phenylene radicals and radicals of the formula:

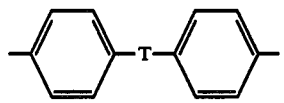

where T represents —CH$_2$—, —C(CH$_3$)$_2$—, —O— or —SO$_2$—; and from 10 to 40% of N-vinylpyrrolid-2-one.

The bis-maleimide of formula (I) may be N,N'-metaphenylene-bis-maleimide, N,N'-(4,4'diphenylether)-bis-maleimide, N,N'-[4,4'-(2,2-diphenylpropane)]-bis-maleimide, N,N-(4,4'-diphenylsulphone)-bis-maleimide and N,N'-(4,4'-diphenylmethane)-bis-maleimide, the last being preferred. A mixture of these bis-maleimides may also be used.

This invention also relates to a composition as defined above, modified by incorporation of an unsaturated polyester before curing. The unsaturated polyesters which may thus be used are per se well known products. They are usually prepared by polycondensation of polycarboxylic acid derivatives and polyols. By polycarboxylic acid derivatives, there are to be understood the acids, their esters of lower alcohols, their acid chlorides and, where appropriate, their anhydrides. Amongst the monomers subjected to the polycondensation, at least one contains an unsaturation of the olefinic type. In the compositions according to the present invention it is essentially proposed to use polyesters in which the unsaturated starting monomers are diacids or dianhydrides having a double bond of the olefinic type in the α,β-position. By way of example, the dicarboxylic acid derivatives may be of the maleic, chloromaleic, itaconic, citraconic, aconitic, pyrocinchonic, fumaric, chlorendic, endomethylenetetrahydrophthalic, tetrahydrophthalic, ethylmaleic, succinic, sebacic, phthalic, isophthalic, adipic and hexahydrophthalic acid derivative type. Amongst the polyols, the most commonly used are ethylene glycol, propylene glycol, diethylene glycol, triethylene glycol, neopentyl glycol, tetraethylene glycol, butylene glycol, dipropylene glycol, glycerol, trimethylolpropane, pentaerythritol, sorbitol, 3,3-bis-(hydroxymethyl)-cyclohexane and tris-(β-hydroxymethyl)-isocyanurate.

The unsaturated polyesters may be readily prepared by applying known methods (for example, see KIRK OTHMER, Encyclopedia of Chemical Technology, 2nd Edition, Vol. 20). The molecular weight of the polymers is preferably between 500 and 10,000.

The expression "unsaturated polyester" used in the present text denotes both the polycondensates described above and solutions of those polycondensates in polymerisable monomers. It is in fact broadly known that certain unsaturated polyesters are used in the form of such solutions. Polymerisable liquid monomers may be, for example, hydrocarbons (styrene, vinyltoluene and divinyl-benzene), ethers (vinyl 2-chloroethyl ether), derivatives of acrylic or methacrylic acids, and allyl derivatives. N-vinylpyrrolidone is also known as a monomeric solvent for unsaturated polyesters. It is therefore to be understood that if an unsaturated polyester is used, the latter may be in the form of a solution in a polymerisable monomer, bearing in mind that the compositions according to the invention must always contain N-vinylpyrrolidone. If a polymerisable monomer is used, it may represent from 10 to 60% of the weight of the solution of unsaturated polyester.

The compositions according to the present invention preferably contain from 65 to 85% by weight of the bis-maleimide and from 15 to 35% of N-vinylpyrrolid-2-one. If an unsaturated polyester is also used, the weight of the latter (or of the solution as defined above) preferably represents from 5 to 60% of the weight of the mixture of the bis-maleimide + N-vinylpyrrolid-2-one.

The compositions according to this invention are prepared by producing an intimate mixture of the constituents. It is possible to produce a solution or suspension of the bis-imide in the N-vinylpyrrolidone, if necessary whilst heating so as to facilitate dissolution, and the unsaturated polyester—if used—may subsequently be incorporated into the solution. It is also possible to melt the bis-maleimide and to mix it with the N-vinylpyrrolidone and, if necessary, the unsaturated polyester. In general, it is not necessary to heat the mixture to more than 130° C to obtain a homogeneous liquid composition.

In the homogeneous liquid state, the compositions according to the present invention may be used directly, for example for impregnating conductors or for molding by simple casting, preferably hot casting. It is also possible, after prior curing by heating, and if appropriate after addition of a catalyst, for example a peroxide, to employ these compositions in the form of a powder, if appropriate in association with fibrous or pulverulent fillers, for example in order to obtain compression-molded articles. The compositions can also be used in solution for the preparation of coatings, glued structures, or laminates of which the skeleton can be based on inorganic fibers, vegetable fibers or synthetic fibers. It is also possible to use these compositions for producing cellular materials after incorporating a blowing agent such as, for example, azodicarbonamide.

The compositions according to this invention exhibit a particularly advantageous combination of properties; before curing they are in the form of a liquid, the low viscosity of which, at moderate temperatures, permits them to be used easily, for example for operations of molding by casting, or for impregnating operations. In this latter type of operation, the compositions are of particular value because of their high agglomerating power on wound filaments (according to Standard Specification NF 26,937). After shaping and curing, usually by heating approximately between 150° and 300° C, articles possessing superior mechanical properties (impact strength or flexural breaking strength) are obtained.

The examples which follow illustrate the invention.

EXAMPLE 1

85 g of N,N' (4,4'-diphenylmethane)-bis-maleimide and 15 g of distilled N-vinylpyrrolid-2 -one are introduced into a reactor surmounted by a stirrer and placed in a bath thermostatically controlled to 130° C. This mixture is stirred for 30 minutes, at the end of which time it has the appearance of a translucent, reddish solution of viscosity less than 2 poises. This solution is degassed by placing the reactor under vacuum for 2 minutes and is then run into a rectangular mold (127 × 75 × 4 mm) previously preheated to 150° C. The whole is heated for 4 hours at 150° C, and then for 16 hours at 200° C, and then for 24 hours at 250° C.

The properties of the molded articles thus prepared are summarized in Table 1 below.

EXAMPLE 2

The operation described in Example 1 is repeated, but this time using a mixture of 75 g of the bis-maleimide of Example 1, 12.5 g of N-vinylpyrrolid-2-one, and 12.5 g of a solution of a polyester resin composed of 40% by weight of diallyl isophthalate and 60% of a polyester prepared from maleic acid, trans-nadic acid, propylene glycol and ethylene glycol. The molecular weight of this polyester is about 2,000. The weight ratio maleic acid/trans-nadic acid is 70/30 and the weight ratio propylene glycol/ethylene glycol is 30/70.

The properties of the molded articles thus prepared under the conditions described above in Example 1 are also summarized in Table 1.

EXAMPLE 3

50 g of the same bis-maleimide (as in Example 1), 12.5 g of N-vinylpyrrolid-2-one, and 37.5 g of the polyester resin solution described in Example 2 are mixed in the apparatus used in Example 1, which is heated to 115° C. The mixture is homogenized for 20 minutes whilst stirring and is then degassed in vacuo and run into the mold used in Example 1, which has been preheated to 150° C. The whole is kept for 4 hours at 150° C, and then for 16 hours at 200° C, and then for 24 hours at 250° C.

The properties of the molded articles thus produced are summarized in Table 1 below.

EXAMPLE 4

Example 3 is repeated, but this time using a composition comprising 50 g of N,N'-diphenylmethane-bis-maleimide, 25 g of N-vinylpyrrolid-2-one, and 25 g of the polyester resin solution described in Example 2.

The properties of the molded articles prepared in this way are summarized in Table 1 below.

TABLE 1

| Properties | Ex. 1 | Ex. 2 | Ex. 3 | Ex. 4 |
|---|---|---|---|---|
| Initial flexural strength in kg/mm$^2$ | | | | |
| at 25° C | 16.5 | 11.5 | 13.3 | 13.3 |
| at 200° C | 6.5 | 6.0 | 5.0 | 3.0 |
| After 1,000 hours' residence at 200° C | | | | |
| at 25° C | 15.7 | 17.4 | 14 | 10.2 |
| at 200° C | 7 | 8.7 | 6.6 | 1.4 |
| Initial flexural modulus in kg/mm$^2$ | | | | |
| at 25° C | 250 | 286 | 306 | 303 |
| at 200° C | 176 | 222 | 150 | 90 |
| After 1,000 hours' residence at 200° C | | | | |
| at 25° C | 250 | 296 | 294 | 321 |
| at 200° C | 200 | 235 | 193 | 134 |
| Impact strength in J/cm$^3$ (Standard Specification PT 51-017) | 1.2 | 0.9 | 0.7 | 0.6 |
| Temperature (in ° C) at which the viscosity reaches | | | | |
| 10 poises | 100 | 90 | 80 | 65 |
| 2 poises | 130 | 115 | 93 | 90 |
| Gel time at 170 C | | | | |
| without catalyst | 40 mins. 30 secs. | 7 mins. | 15 mins. | 30 secs. |
| with 0.1% of dicumyl peroxide | 45 sec. | 30 secs. | 30 secs. | 30 secs. |

EXAMPLE 5

The limpid solution obtained in Example 1, after homogenization of the mixture of the reactants at 130° C for ½ hour, is cooled by pouring onto a plate.

This resin is then placed in an oven at 150° C for 20 minutes; the powder obtained after grinding, which has a softening point of 85° C, is returned to the oven at 150° C for 10 minutes to reach a softening point of 130° C.

After renewed grinding, the powder is shaped by compression molding at 200° C under a pressure of 200 bars.

The molded articles thus obtained are baked for a further 24 hours at 200° C and then for 24 hours at 250° C.

The impact strength is 0.9 J/cm$^3$ and the flexural breaking strength is 15 kg/mm$^2$ (at 25° C).

EXAMPLE 6

The limpid solution obtained in Example 1, after homogenization of the mixture of the reactants at 130° C for ½ hour, is kept at 100° C.

Solenoids made from aluminum wire of 1 mm diameter, wound in adjoining turns on a 6 mm mandrel of a total length of about 70 mm, are impregnated with this solution by dipping.

Two successive impregnations, separated by a residence of 30 minutes in an oven at 180° C, are carried out.

After the second impregnation, a 24 hour baking at 200° C is carried out.

The agglomerating power of the impregnating varnish (Standard Specification NF C 26-937) is determined by measuring the flexural breaking strength of the impregnated solenoid.

The mean value obtained is 15.4 kg.

EXAMPLE 7

The following are mixed intimately by gradual heating at 100° C: 75 g of N,N'-(4,4'-diphenylmethane)-bis-maleimide, 12.5 g of N-vinylpyrrolid-2-one, 12.5 g of the polyester resin solution described in Example 2, 5 g of azodicarbonamide as a blowing agent, and 1 g of a surface-active agent of the polyalkylene glycol laurate type marketed under the trademark "Céprétrol J".

75 g of the product thus obtained after homogenization are placed in a receptacle consisting of a steel frame of size 150 × 150 × 30 mm placed on an aluminum foil, which is turned up along the external walls of the frame. The whole is placed between two chromium-plated brass plates and the receptacle thus formed is in turn placed between the two platens of a press, these platens having been preheated to 200° C.

The platens are brought into contact with the brass plates without applying pressure and the whole is left for 20 minutes to allow the foam to expand.

The cellular material obtained, of density 0.08, is baked for a further 24 hours at 250° C.

The compressive strength—for 10% compression—of a 5 × 5 cm sample, measured according to Standard Specification ASTM D 1621-64 (traverse speed: 2.5 mm/min) is 5.3 kg/cm².

The L.O.I. measured according to Standard Specification ASTM D 2863-70 is 37.5.

EXAMPLE 8

A cellular material of density 0.08 is obtained in accordance with the same procedure as that described above in Example 7, but this time using a starting mixture composed of 80 g of N,N'-(4,4'-diphenylmethane)-bis-maleimide, 20 g of N-vinyl-pyrrolid-2-one, 5 g of azodicarbodiamide, and 1 g of the polyalkylene glycol laurate surface-active agent of Example 7.

The L.O.I. of the material thus obtained is 43.5 and the compressive strength is 2.4 kg/cm².

EXAMPLE 9

The operation described in Example 2 is repeated, but this time using a polyester resin solution composed of 40% by weight of diallyl isophthalate and 60% of a propylene glycol maleate (molecular weight: 1,450).

The molded article thus obtained has a flexural breaking strength of 14 kg/mm², measured at 25° C.

What is claimed is:

1. A thermosetting composition, characterized in that it consists essentially of, by weight,
   from 60 to 90% of a bis-maleimide of the formula:

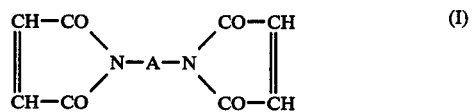

in which A represents a divalent radical chosen from the group consisting of phenylene radicals and radicals of the formula:

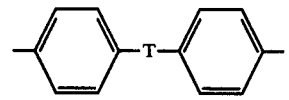

where T represents $-CH_2-$, $-C(CH_3)_2-$, $-O-$ or $-SO_2-$; and from 10 to 40% of N-vinylpyrrolid-2-one.

2. A composition according to claim 1, characterized in that the bis-maleimide is N,N'-(4,4'-diphenylmethane)-bis-maleimide.

* * * * *